3,629,159
REGENERATION OF SPENT ZINC HALIDE CATALYST USING PRELIMINARY HIGH PRESSURE HYDROGEN SOLVENT EXTRACTION
Everett Gorin, Robert T. Struck, and Metro D. Kulik, Pittsburgh, Pa., assignors of a fractional part interest to Consolidation Coal Company, Library, Pa., and to the United States of America as represented by the Secretary of the Interior
No Drawing. Filed Dec. 3, 1969, Ser. No. 881,914
Int. Cl. B01j 11/80; C10g 1/06
U.S. Cl. 252—414　　　　　　　　　　　　　　3 Claims

ABSTRACT OF THE DISCLOSURE

Spent zinc halide hydrocracking catalyst is contacted with a nonpolar hydrocarbon solvent in the presence of high pressure hydrogen to extract unconverted hydrocarbonaceous residue from the spent catalyst.

---

This invention relates to the regeneration of spent zinc halide catalyst which has been employed in the hydrocracking of polynuclear aromatic hydrocarbonaceous materials.

A process for the catalytic hydrocracking of polynuclear hydrocarbonaceous materials is described in British Pat. No. 1,095,851. As set forth in that patent, polynuclear hydrocarbons, even those which are non-distillable, may be readily converted in the presence of a large quantity of molten zinc halide to low boiling liquids suitable for fuels such as gasoline. The amount of zinc halide which serves as catalyst must be at least fifteen weight percent of the inventory of hydrocarbonaceous material in the hydrocracking zone. To this amount of zinc halide must be added, in the case of nitrogen- and sulfur-containing feedstock, sufficient zinc halide to remove reactive nitrogen and sulfur compounds in the feedstock, in accordance with the following equations, wherein zinc chloride is used as an example of the catalyst:

(1)　　　　$ZnCl_2 + H_2S = ZnS + 2HCl$
(2)　　　　$ZnCl_2 + NH_3 = ZnCl_2 \cdot NH_3$
(3)　　　　$ZnCl_2 \cdot NH_3 + HCl = ZnCl_2 \cdot NH_4Cl$ In the case of a feedstock consisting of coal extract containing, for example, 1.5 percent N and 2 percent S, the amount of zinc chloride required to react stoichiometrically with the nitrogen and sulfur compounds is about twenty-three percent by weight of the feedstock. A successful commercial process using a molten zinc halide catalyst must therefore provide for the regeneration of the catalyst.

The problem of regenerating the zinc halide catalyst is complicated by the present of unconverted hydrocarbonaceous material in the spent catalyst mixture. This unconverted material must be removed before the catalyst can be efficiently regenerated. Furthermore, it is desirable to separate as much as possible of the unconverted hydrocarbonaceous residue from the spent catalyst, and to recycle the residue to the hydrocracking zone. Such maximum recycling of residue facilitates a high conversion of the hydrocarbonaceous feedstock, and it has been found that at conversion levels in the range of 65 to 85 percent a higher percentage of product boiling in the liquid fuel range is obtained.

One approach to the separation of inorganic substances such as zinc halide from organic substances such as hydrocarbonaceous material that naturally occurs to one is solvent extraction. However, in this instance, many difficulties are encountered when solvent extraction is attempted. It was found that the unconverted hydrocarbonaceous residue forms a complex with zinc halide in the spent catalyst. Polar solvents break down the complex but effect very poor separation of the organic residue from the inorganic components. Nonpolar solvents are very effective extractants. They also provide a fluid organic phase which is readily handled. However, it was found that nonpolar solvents are polymerized during the process and may even undergo a condensation reaction with the unconverted residue to form insoluble products that remain in the spent catalyst. In fact, in some instances, after treatment with nonpolar solvents, the spent catalyst was found to have a higher carbon content after extraction than before.

It has now been discovered that relatively nonpolar hydrocarbon solvents will readily extract hydrocarbonaceous residue from spent zinc halide catalyst in the presence of high pressure hydrogen. By relatively nonpolar hydrocarbon solvents is meant those hydrocarbon solvents which have no functional groups that can form complexes with zinc halides, for example, phenolic groups and nitrogen bases. Aromatic solvents are preferred, particularly those containing only one aromatic ring per molecule. In actual practice, the natural distillate oil would be used, that is, either the 80×400° C. distillate fraction or the 200×400° C. distillate fraction, derived from the hydrocracking of the coal extract.

The invention is based upon the discovery that the polymerization and/or condensation reaction involving the hydrocarbon solvent is prevented and any zinc halide residue complex is largely destroyed by the use of high pressure hydrogen. It has been found that not only is most of the available hydrocarbonaceous residue extracted from the catalyst, but also almost no inorganic components are found in the organic phase. Very little of the hydrocarbon solvent is converted to other hydrocarbons or occluded by the spent catalyst. Thus, almost all of the solvent may be recovered for reuse.

It is therefore an object of the present invention to provide an efficient process for extraction of unconverted hydrocarbonaceous residue from spent zinc halide catalyst.

Other objects and advantages will be obvious from the following more detailed description of the invention.

In the practice of the present invention, the following operating conditions are suitable:

Temperature—200 to 400° C.
Pressure—1000 to 5000 p.s.i.g.
Residence time—5 to 120 min.
Solvent to spent catalyst
　(including residue), ratio—0.25 to 2.0

The hydrocarbon solvents that may be conveniently used in the process are those boiling in the range 80 to 400° C. Examples are tetralin, n-decane, dimethylnaphthalene, and, as stated above, the distillate oils derived from the hydrocracking process itself.

Table I below tabulates the results obtained by extraction of a spent $ZnCl_2$ catalyst with different distillate fractions produced in the hydrocracking of coal extract.

Table II below tabulates the results obtained by extraction of a spent $ZnCl_2$ catalyst with tetralin. No hydrogen was used in Run A. The extraction was carried out in a 300 milliliter shaking autoclave. The shaking time at run temperature was 15 minutes.

TABLE I.—SUMMARY OF EXTRACTIONS WITH NATURAL SOLVENT+$H_2$

| Run number | A | B | C |
|---|---|---|---|
| Solvent (distillate boiling range), °C | 220×225 | 200×300 | 225×400 |
| Solvent/spent catalyst (wt. ratio) | 0.66 | 0.66 | 0.66 |
| $H_2$ pressure (p.s.i.g.) | 3,000 | 3,000 | 3,000 |
| Temperature (°C.) | 662 | 572 | 662 |
| Available unconverted oil recovered (percent) | 66.7 | 66.7 | 68.4 |
| Inorganics in organic phase (percent): | | | |
| Zn | 0.00 | 0.93 | 0.56 |
| N | 0.07 | 0.00 | 0.05 |
| S | 0.21 | 0.17 | 0.21 |

TABLE II.—SUMMARY OF EXTRACTIONS WITH TETRALIN+$H_2$

| Run number | A | B | C | D |
|---|---|---|---|---|
| Solvent/spent catalyst (wt. ratio) | 0.66 | 0.66 | 0.66 | 0.66 |
| $H_2$ pressure (p.s.i.g.) | 0 | 3,000 | 3,000 | 2,000 |
| Temperature (°C.) | 350 | 350 | 400 | 350 |
| Available unconverted oil recovered (percent) | 35.1 | 80.7 | 75.4 | 63.2 |
| Inorganics in organic phase (percent): | | | | |
| Zn | 0.29 | 0 | 0 | 0.55 |
| N | 0.06 | 0.07 | 0 | 0.05 |
| S | 0.18 | 0.15 | 0.08 | 0.17 |
| Tetralin feed converted to heavy oil (wt. percent) | 5.0 | 1.8 | 4.9 | 3.0 |

As can be seen from these tables, high recovery of unconverted oil from spent catalyst is attained by the process of the present invention.

What is claimed is:

1. In a process for regenerating spent zinc halide catalyst which has been employed in the hydrocracking of polynuclear aromatic hydrocarbonaceous material, and which contains unconverted hydrocarbonaceous material, the improvement comprising contacting said spent catalyst with a nonpolar hydrocarbon solvent in the presence of hydrogen at 1000–5000 p.s.i.g. pressure to extract said material separating the extracted material; recycling said extracted material to the hydrocracking zone; and regenerating said spent catalyst.

2. The process of claim 1 wherein said solvent boils in the range of 80° C.–400° C.

3. The process of claim 2 wherein said solvent is selected from the group consisting of tetralin, n-decane, dimethylnaphthalene, and distillate oils obtained from said hydrocracking process.

References Cited

UNITED STATES PATENTS

| 2,749,288 | 6/1956 | Watkins | 208—113 X |
| 2,768,935 | 10/1956 | Watkins | 208—8 X |
| 3,355,376 | 11/1967 | Gorin et al. | 208—10 |
| 3,371,049 | 2/1968 | Gorin et al. | 208—10 X |
| 3,505,206 | 4/1970 | Decker | 252—412 X |
| 3,505,207 | 4/1970 | Haney et al. | 252—414 X |

DANIEL E. WYMAN, Primary Examiner

P. E. KONOPKA, Assistant Examiner

U.S. Cl. X.R.

208—10